United States Patent
Seki et al.

(10) Patent No.: US 6,408,719 B1
(45) Date of Patent: Jun. 25, 2002

(54) DIFFERENTIAL MECHANISM

(75) Inventors: Bunzo Seki; Akio Handa; Yasuhiro Higashi; Akio Senda; Kazushiro Inoue, all of Wako; Satoru Noguchi, Shizuoka-pref, all of (JP)

(73) Assignees: Honda Giken Kogyo Kabushiki Kaisha, Tokyo; F.C.C. Co., Ltd., Shizuoka-pref, both of (JP)

( * ) Notice: Subject to any disclaimer, the term of this patent is extended or adjusted under 35 U.S.C. 154(b) by 0 days.

(21) Appl. No.: 09/654,275

(22) Filed: Sep. 1, 2000

(30) Foreign Application Priority Data

Sep. 2, 1999 (JP) .......................... 11-249215

(51) Int. Cl.[7] .............................................. F16H 48/12
(52) U.S. Cl. ........................................ 74/650; 475/230
(58) Field of Search ........................... 74/650; 475/231, 475/236, 243

(56) References Cited

U.S. PATENT DOCUMENTS

| | | | |
|---|---|---|---|
| 5,029,491 A | * 7/1991 | Carden | 74/650 |
| 5,062,320 A | * 11/1991 | Parsons et al. | 74/650 |
| 5,557,986 A | * 9/1996 | Young et al. | 74/650 |
| 5,560,268 A | * 10/1996 | Young | 74/650 |
| 5,609,073 A | * 3/1997 | Spooner et al. | 74/650 |

FOREIGN PATENT DOCUMENTS

EP    PCT/GB94/01329    6/1994

* cited by examiner

Primary Examiner—Charles A Marmor
Assistant Examiner—Tisha D. Lewis
(74) Attorney, Agent, or Firm—Merchant & Gould, P.C.

(57) ABSTRACT

A differential mechanism comprises a differential case assembly having a casing body connected to a source of drive force and a cap member coupled with the casing body to cover one opened end of the casing body, a plurality of input blocks housed in the case assembly and being movable circumferentially of the case assembly in correspondence with rotation of the casing body, and a pair of output cam members for clamping the input blocks relatively slidably and being independently rotatable owing to a frictional force produced with respect to each of the input blocks to thereby initiate a differential motion on an output side of the differential mechanism. The input blocks are provided in at least two different types and having projected portions. The projected portions of the input blocks of one type have a first upper end width while the projected portions of the input blocks of another type have a second upper end width different from the first upper end width. The casing body has first and second axial grooves provided on an inner peripheral surface thereof such that they extend axially of the differential mechanism. The axial grooves are shaped complementary to the projected portions of the input blocks for meshing engagement therewith. This arrangement prevents misassembling of the differential mechanism.

4 Claims, 4 Drawing Sheets

DIFFERENTIAL MECHANISM

BACKGROUND OF THE INVENTION

1. Field of the Invention

This invention relates to an improvement in a differential mechanism being arranged to prevent misassembling thereof.

2. Description of the Related Art

A differential mechanism comprises a gear assembly disposed between two drive shafts for permitting one shaft to turn at a different speed from the other, while transmitting power. An example differential mechanism is disclosed in International Publication No. WO 95/00777 "DIFFERENTIAL MECHANISM".

The disclosed differential mechanism comprises an input housing having a plurality of grooves formed in an inner peripheral surface of the housing, and a plurality of two different types of cam followers disposed Internally of the housing. The cam followers include elongate drive dogs formed integrally there with for engaging in the grooves. The drive dogs of the cam followers of one type have grooves for distinguishing that type from another. When they are fitted into the input housing, the cam followers are arranged In an annular array such that two of the drive dogs with the distinguishing grooves and two of the drive dogs without such grooves are positioned alternately in close proximity.

In the disclosed differential mechanism thus arranged, for the condition of assemblage, it must be confirmed through the eyes of an attendant whether the drive dogs have the grooves or not, whereupon a misjudgment or an oversight may occur, thereby causing misassembling of the cam followers.

To cope with this problem, one may propose to conduct an operation test, after completion of the differential mechanism, on all of the cam followers to confirm whether misassembling occurred in the mechanism. However, such a proposal is not a panacea in that it requires additional man hours, thereby deteriorating the productivity.

SUMMARY OF THE INVENTION

It is therefore an object of the present invention to provide a differential mechanism which is arranged to prevent misassembling of the mechanism with increase surety.

According to an aspect of the present invention, there is provided a differential mechanism which comprises: a differential case assembly having a casing body connected to a source of drive force and a cap member coupled with the casing body to cover one opened end of the casing body; a plurality of input blocks housed in the case assembly and being movable circumferentially of the case assembly in correspondence with rotation of the casing body; a pair of output cam members for clamping the input blocks relatively slidably and being independently rotatable owing to a frictional force produced with respect to each of the input blocks to thereby independently rotatable owing to a frictional force produced with respect to each of the input blocks to thereby initiate a differential motion on an output side of the differential mechanism; the input blocks being provided in at least two different types and having projected portions, the projected portions of the input blocks of one type having a first upper end width, the projected portions of the input blocks of another type having a second upper end width different from the first upper end width; and the casing body having first and second axial grooves formed on an inner peripheral surface thereof such that they extend axially of the differential mechanism, the axial grooves being shaped complementarily to the projected portions of the input blocks for meshing engagement therewith.

With this arrangement, it becomes possible to surely prevent misassembling of the input blocks with the casing body. This leads to the further advantage that extra man hours, required in reassembling after misassembling is found, can be avoided, thereby increasing productivity.

Desirably, the input blocks are arranged in an annular array such that two of the input blocks of one type and two of the input blocks of another type are positioned alternately. It is also desirable that two of the first axial grooves and two of the second axial grooves are positioned alternately in correspondence with the input blocks.

Preferably, the axial grooves of the casing body have a substantially trapezoidal cross section. The first upper end width of each of the projected portions of the input blocks of one type may be larger than the second upper end width of each of the projected portions of the input blocks of another type.

Each of the second axial grooves may be provided with a projection at a bottom thereof while each of the projected portions of the input blocks of another type may be provided on an upper surface thereof with a recessed portion shaped complementary to the projection.

BRIEF DESCRIPTION OF THE DRAWINGS

A preferred embodiment of the present invention will hereinafter be described in detail, by way of example only, with reference to the accompanying drawings, which.

DETAILED DESCRIPTION OF THE PREFERRED EMBODIMENT

The following description is merely exemplary in nature and is in no way intended to limit the invention or its application uses.

Figure 1:
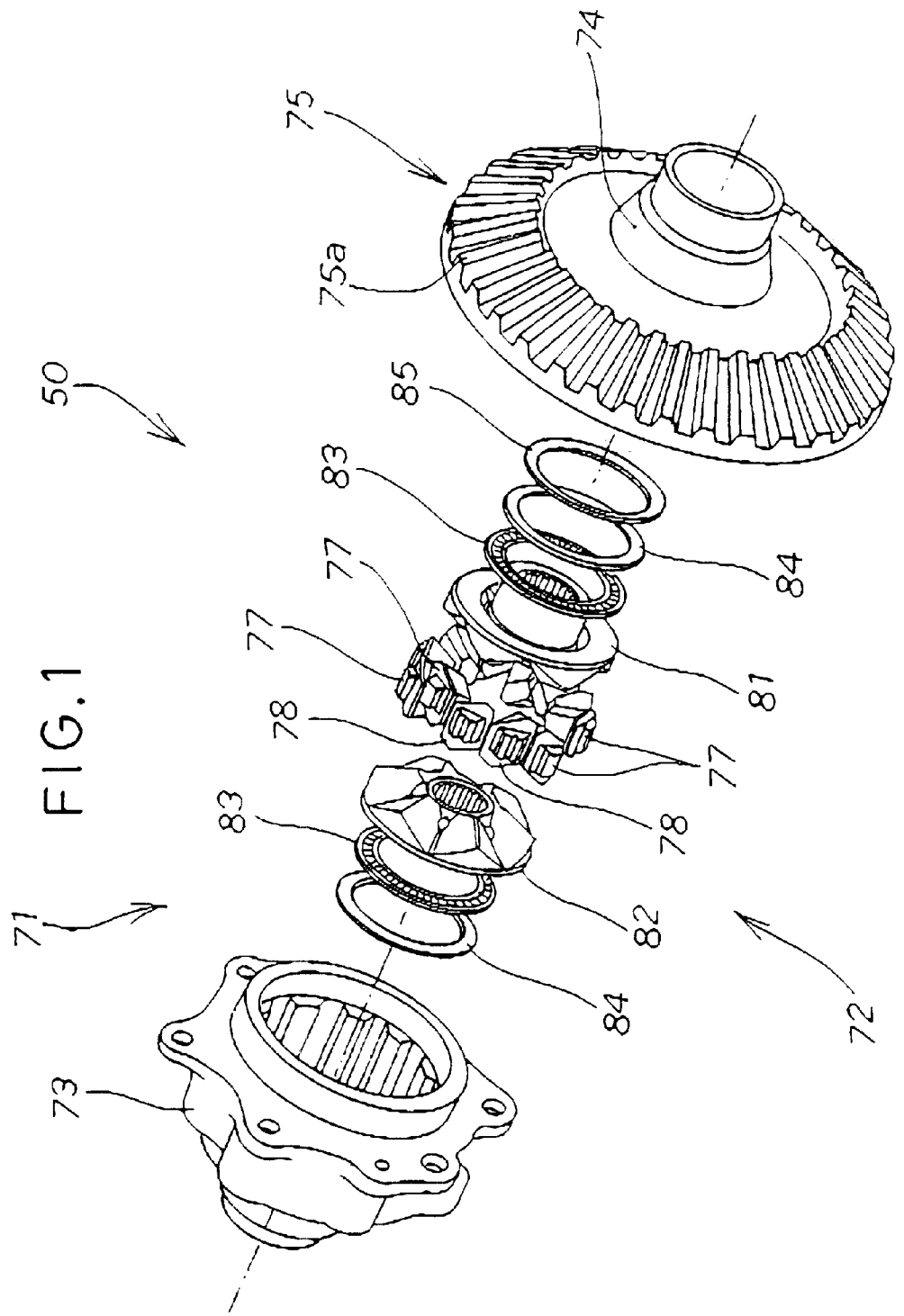
FIG. 1 is an exploded perspective view illustrating a differential mechanism according to the present invention.

Referring initially to FIG. 1, a differential mechanism 50 comprises a differential case assembly 71 and parts or components 72 housed in the case assembly 71.

The differential case assembly 71 comprises a tubular casing body 73 and a cap member 75 fitted with the casing body to cover one opened end of the casing body 73, the cap member 75 having an integral bevel gear 75a and a cap portion 74 on a surface thereof remote from the casing body 73.

Included in the housed parts 72 are two different types of input blocks 77, 78 coupled with the casing body 73 and being rotatable therewith, right and left cam members 81, 82 clamping or sandwiching the input blocks 77, 78 relatively slidably and being independently rotatable owing to a frictional force with respect to each block, thrust bearings 83, 83 provided adjacent to the output cam members 81, 82, thrust washers 84, 84, and a coned disk spring 85 provided in close proximity to the cap member 75. The thrust bearings 83, 83 may be omitted if desired.

Figure 2:
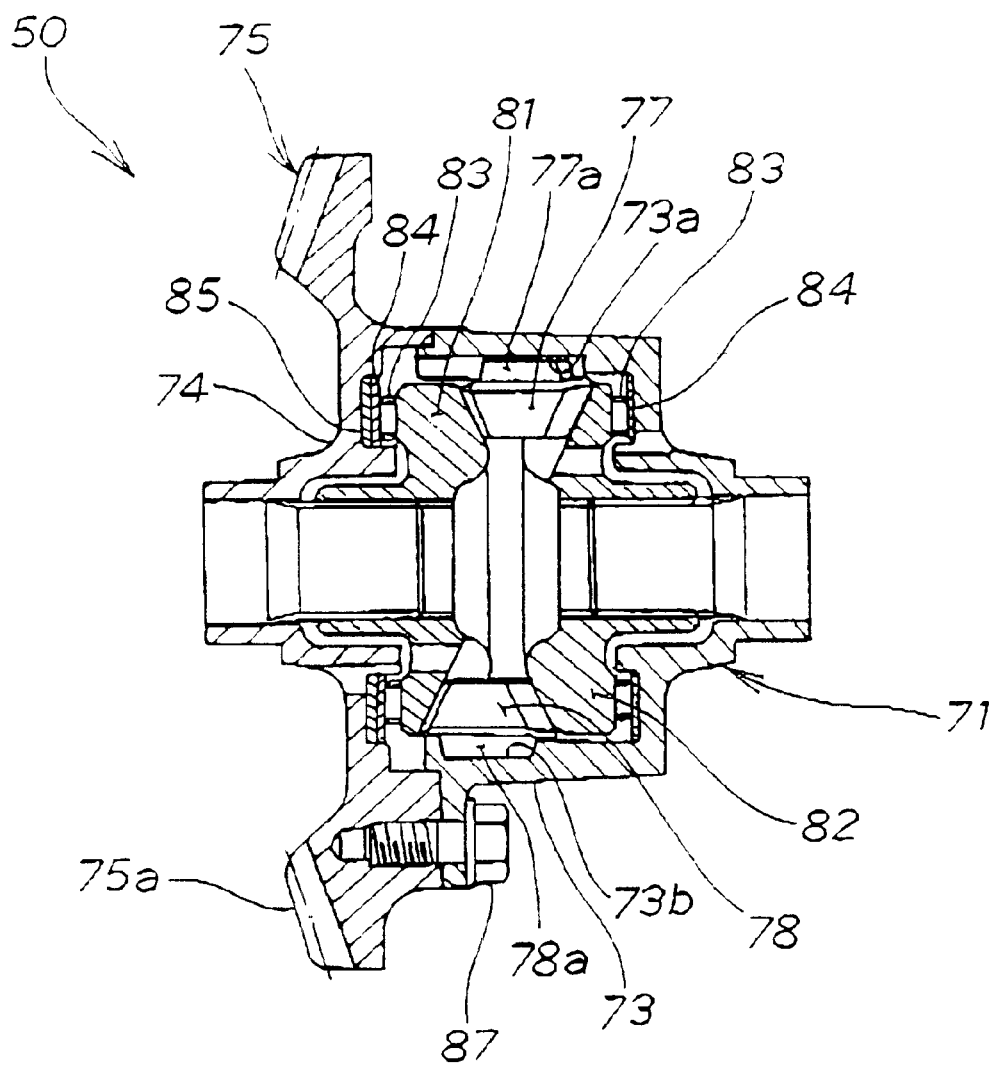
FIG. 2 is a cross-sectional view of the differential mechanism as assembled.

In the differential mechanism 50 as assembled as shown in FIG. 2, the casing body 73 houses the thrust washers 84, thrust bearing 83, right output cam member 82, input blocks 77, 78, left output cam member 81, thrust bearing 83, thrust washer 84 and coned disk spring 85 laid one over the other in an order in which they are mentioned. The cap member 75 is fastened to the casing body 73 by means of a bolt 87.

Figure 3A:
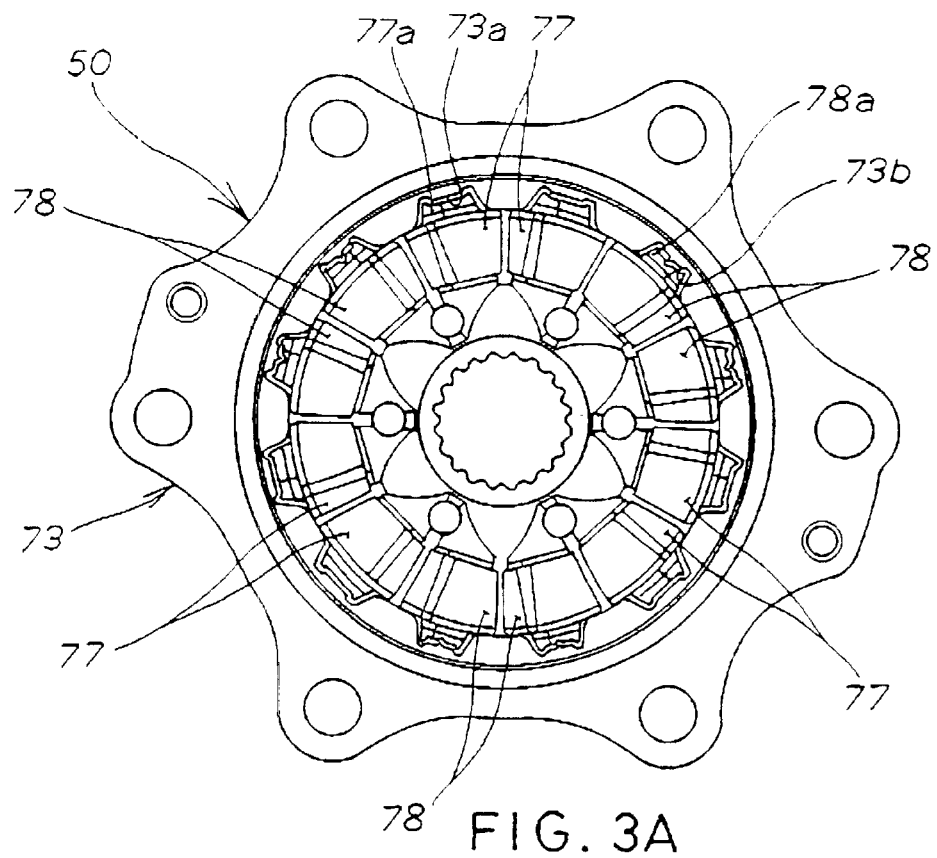
FIGS. 3A through 3C are schematic views illustrating input blocks of the differential mechanism.

Reference is made next to FIG. 3A showing the differential mechanism as assembled but with the cap member 75 and left output cam member 81 removed. On an inner peripheral surface, the casing body 73 has first and second axial recesses or grooves 73a, 73b each provided in alternate pairs and extending parallel to a rotary shaft (extending in a front-and-back direction of the drawing sheet but not shown) of the differential mechanism 50. The input blocks 77, 78 have respective projected portions 77a, 78a provided in alternate pairs so that they can be engaged in the axial grooves 73a, 73b of the casing body 73.

Figure 3B:
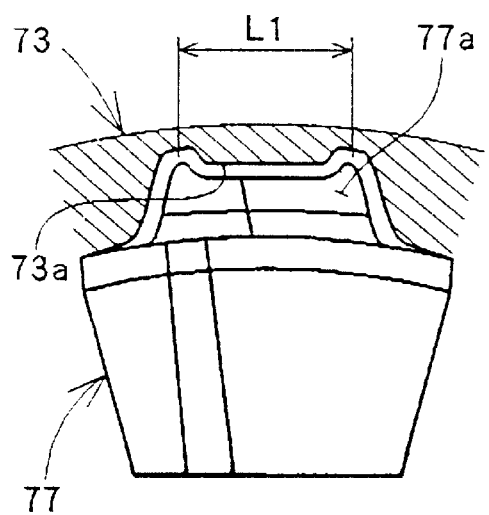

In FIG. 3B, the casing body 73 and one of the input blocks 77 meshing therewith are shown on an enlarged scale. Each axial groove 73a has a substantially trapezoidal cross section. Each projected portion 77a is shaped complementarily to the axial grooves 73a and has an upper end width L1.

Figure 3C:
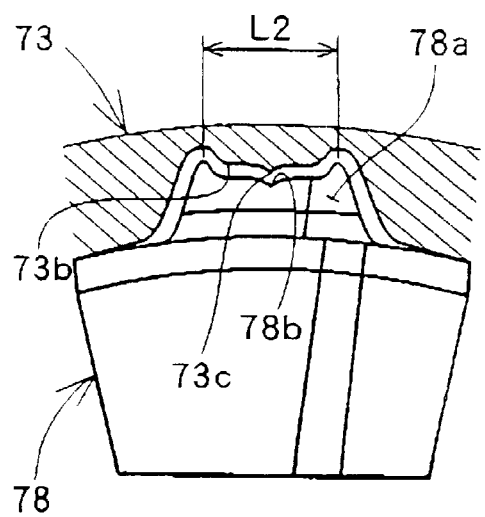

FIG. 3C shows the casing body 73 and one of the input blocks 78 meshing therewith on an enlarged scale. Each axial groove 73b has a substantially trapezoidal cross section. Each projected portion 78a is shaped complementarily to the axial grooves 73b and has an upper end width L2. As can be readily appreciated from comparison, the width L1 of the projected portion 77a and the width L2 of the projected portion 78a are different from each other, that is, L1 L2. In FIGS. 3B and 3C, L1>L2 but this may be L1>L2. Each axial groove 73b has a projection 73c at a bottom thereof. On an upper surface, the projected portion 78a has a recessed portion 78b corresponding to the projection 73c.

Figure 4A:
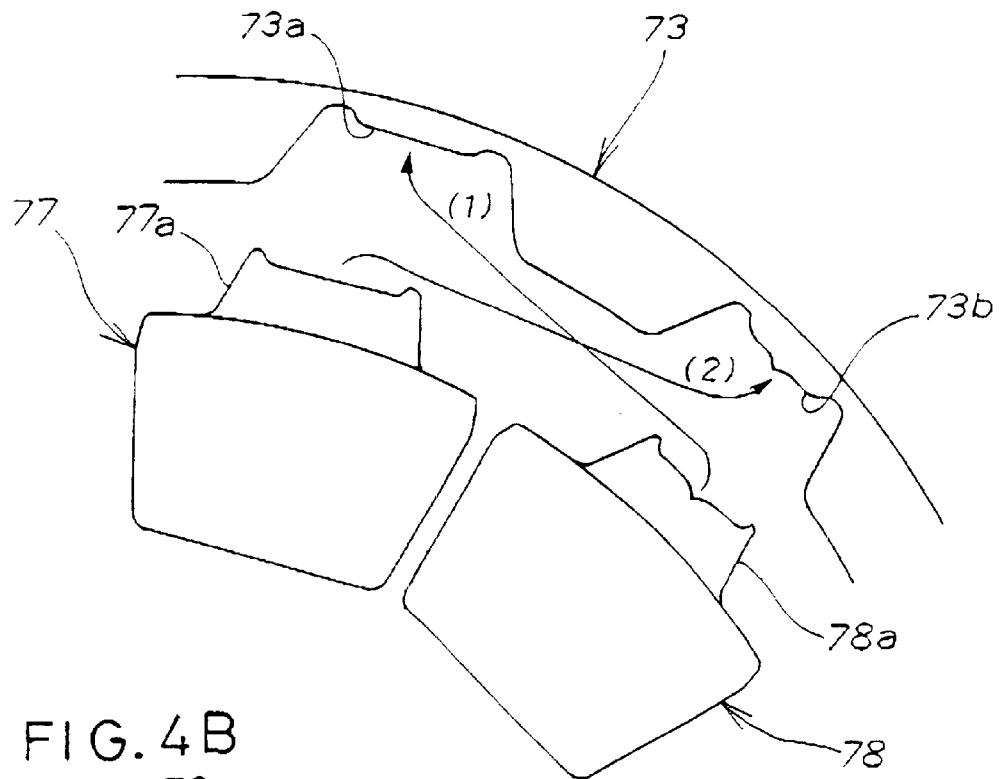
FIGS. 4A and 4B are views illustrative of misassembling of the input blocks.
Figure 4B:
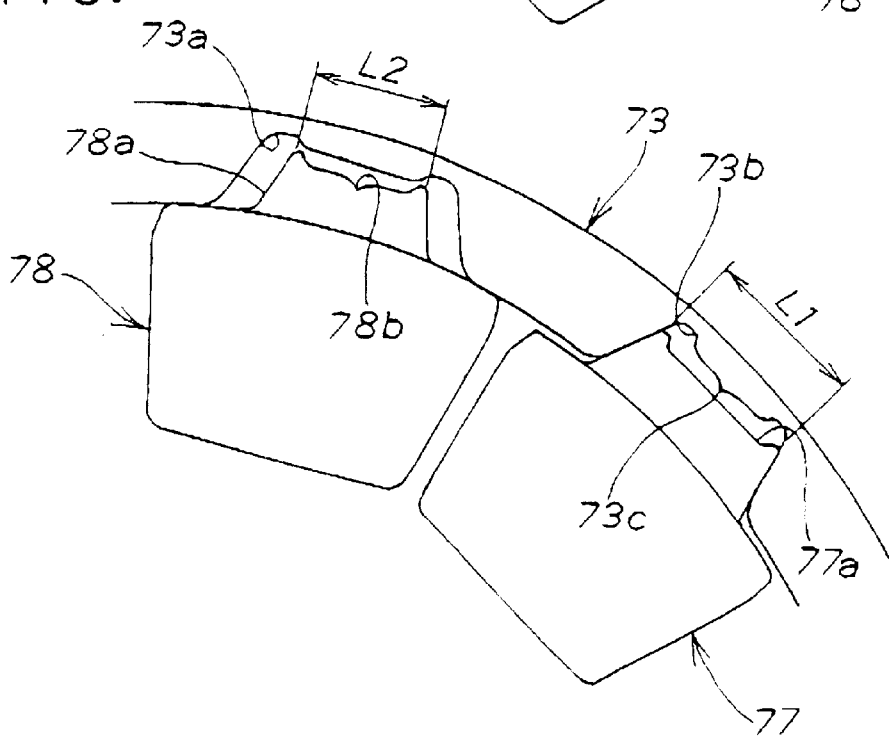

Referring to FIGS. 4A and 4B, discussion will be made next as to how misassembling of the input blocks of the differential mechanism according to the present invention can be prevented.

The projected portion 77a of the input block 77 Is designed to be fitted in the axial groove 73a of the casing body 73 while the projected portion 78a of the input block 78 is designed to be fitted in the axial groove 73b of the casing body 73. However, it may happen that erroneous attempts are made to engage the projected portion 78a of the input block 78 in the axial groove 73a of the casing body 73, as shown by arrow (1) in FIG. 4A, and to engage the projected portion 77a of the input block 77 in the axial groove 73b of the casing body 73, as shown by arrow (2) in FIG. 4A. In the case of the attempt (1), since the width L2 of the input block 78 is larger than the width L1 of the input block 77, a large clearance is formed between the axial groove 73a of the casing body 73 and the projected portion 78a of the input block 78, as shown in FIG. 4B. Conversely, in the case of the attempt (2), the projected portion 77a of the input block 77 can not be fully engaged in the axial groove 73b of the casing body 73. As a result, misassemblage can be easily perceived in both attempts (1) and (2) with certainty.

Further, since the projection 73c of the axial groove 73b and the recessed portion 78b of the projected portion 78a do not match with each other. This can also be perceived easily, thereby providing an additional mode to ascertain misassemblage.

As already explained in relation to FIGS. 3B and 3C, the upper end widths of the projected portions are taken In a direction perpendicular to a radial direction of the casing body. However, what is important herein is that the input blocks should be provided in two different types with their projected portions dimensioned differently so that the projected portions can not engage in other axial grooves than intended ones.

Obviously, various minor changes and modifications of the present invention are possible in the light of the above teaching. It is therefore to be understood that within the scope of the appended claims the invention may be practiced otherwise than as specifically described.

What is claimed is:

1. A differential mechanism comprising:
   a differential case assembly having a casing body connected to a source of drive force and a toothed cap member coupled with said casing body to cover one opened end of said casing body;
   a plurality of input blocks housed in said case assembly and being movable circumferentially of said case assembly in correspondence with rotation of said casing body;
   a pair of output cam members for clamping said input blocks relatively slidably and being independently rotatable owing to a frictional force produced with respect to each of said input blocks to thereby initiate a differential motion on an output side of said differential mechanism:
   said input blocks being provided in at least two different types and having projected portions, said projected portions of said input blocks of one type having a first upper end width, said projected portions of said input blocks of another type having a second upper end width different from said first upper end width; and
   said casing body having first and second axial grooves formed on an inner peripheral surface thereof such that they extend axially of said differential mechanism, said first axial grooves being shaped complementarily to the projected portions of the input blocks of one type having a first upper end width for fitting engagement therewith, said second axial grooves being shaped complementarily to the projected portions of the input blocks of said another type having a second upper end width different from said first upper end width.

2. A differential mechanism according to claim 1, wherein said input blocks are arranged in an annular array such that two of said input blocks of one type and two of said input blocks of another type are positioned alternately, and two of said first axial grooves and two of said second axial grooves are positioned alternately in correspondence with said input blocks.

3. A differential mechanism according to claim 1, wherein said axial grooves of said casing body have a substantially trapezoidal cross section, and said first upper end width of each of said projected portions of said input blocks of one type is larger than said second upper end width of each of said projected portions of said input blocks of another type.

4. A differential mechanism according to claim 1, wherein each of said second axial grooves has a projection at a bottom thereof, and each of said projected portions of said input blocks of another type has on an upper surface thereof a recessed portion shaped complementary to said projection.

* * * * *